July 4, 1967 R. F. HODGSON ET AL 3,329,169
HYDRAULIC VALVES
Filed April 19, 1965 3 Sheets-Sheet 1

INVENTORS
Robert F. Hodgson &
Arthur J. Williams

July 4, 1967 R. F. HODGSON ETAL 3,329,169
HYDRAULIC VALVES
Filed April 19, 1965 3 Sheets-Sheet 2
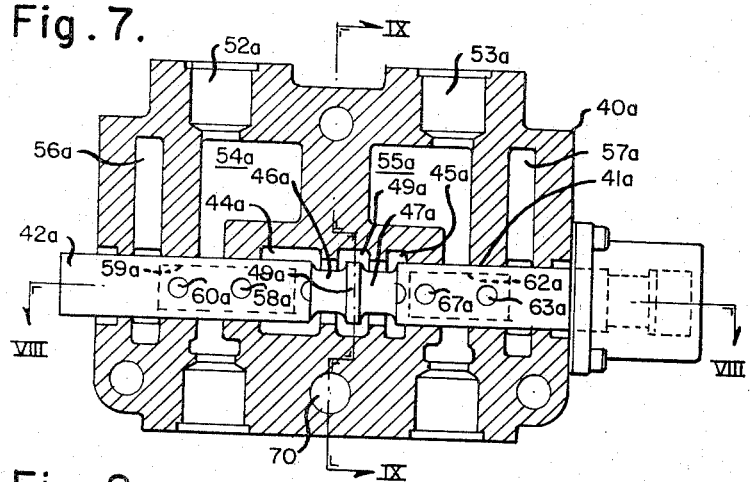
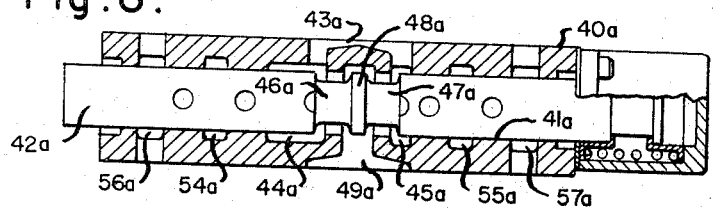
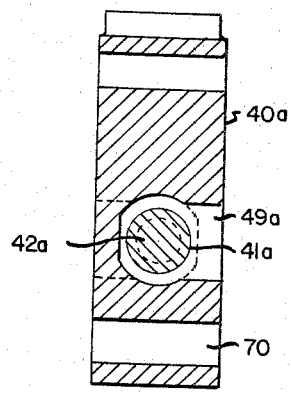
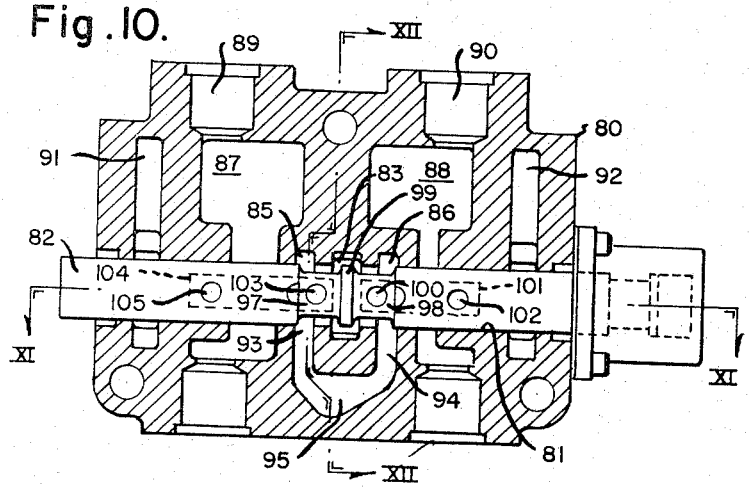
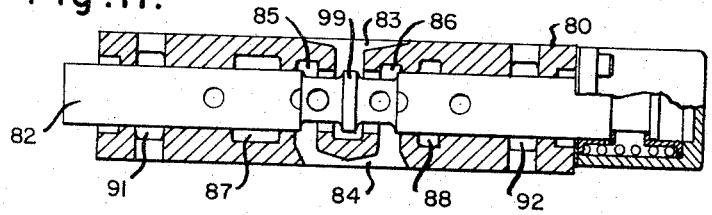
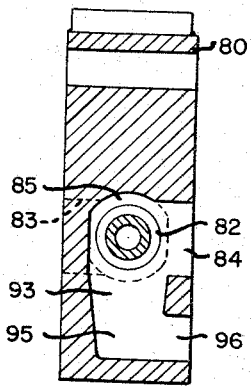
INVENTORS
Robert F. Hodgson &
Arthur J. Williams

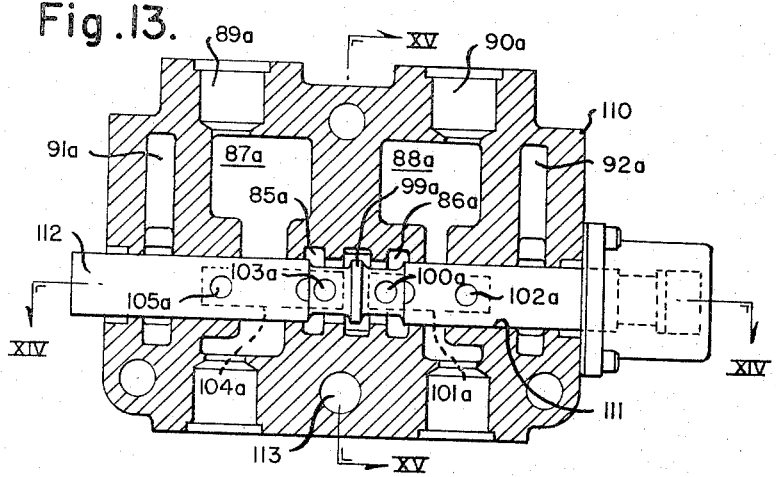
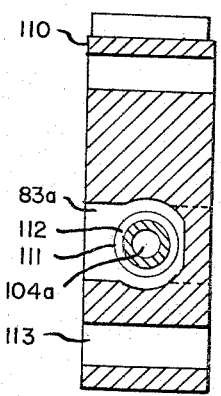
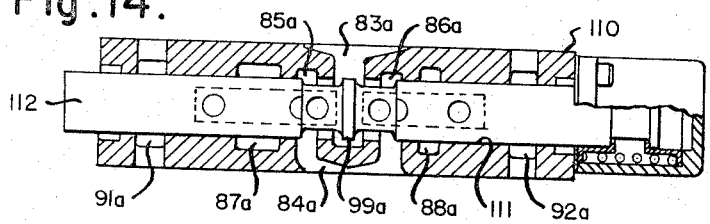
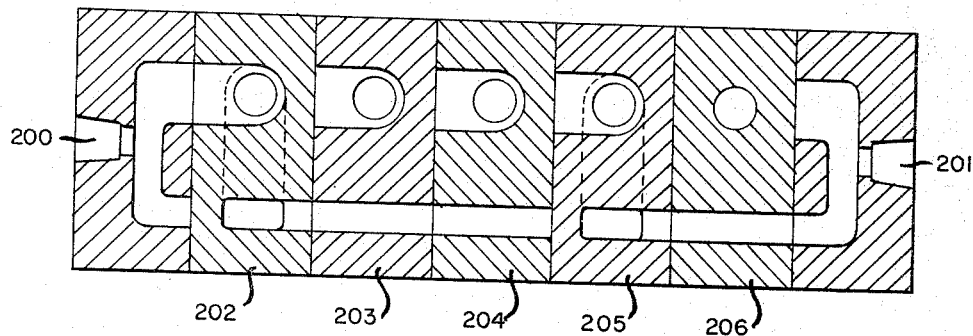

United States Patent Office 3,329,169
Patented July 4, 1967

3,329,169
HYDRAULIC VALVES
Robert F. Hodgson, Canfield, and Arthur J. Williams, Hubbard, Ohio, assignors to Commercial Shearing & Stamping Co., a corporation of Ohio
Filed Apr. 19, 1965, Ser. No. 449,070
6 Claims. (Cl. 137—625.68)

This invention relates to hydraulic valves and particularly to hollow spool valves adapted to multiple configurations of priority, series and parallel valves.

Hollow spool valves are not per se new. Such spools have been used in the past in various valve forms but they have been subject to certain deficiencies and limitations. For example, in order to obtain float action, it has been common to form the spool with an axial passage entirely through the spool length. In open center valves this requires drastic reduction in wall thickness of the spool at the center of the valve creating zones of weakness in the center of the spool. Moreover, in order to obtain parallel functioning of the valve, the length of the valve and the number of cores became undesirably increased over normal valve structures.

We have invented a valve structure, preferably in sectional form, which overcomes these problems and which is adapted to all forms of parallel, series and priority valving.

In a preferred embodiment of our invention we provide a valve body having an inlet means and outlet means therein, a bore extending through said body, an inlet chamber intersecting the bore communicating with the inlet means, an outlet chamber intersecting the bore spaced from the inlet chamber and communicating with the outlet means, a passage in said body transverse to said bore in a plane parallel to and spaced from the plane of the inlet and outlet chambers and bore, said passage receiving fluid from one of the inlet means and the outlet means when fluid is introduced into the inlet means, a pair of motor port chambers intersecting said bore, one on each side of the inlet and outlet chambers, exhaust passage means intersecting the bore adjacent each work port chamber, a valve element shiftable longitudinally of the bore from a neutral position in which fluid entering the inlet chamber passes to the outlet chamber through the bore around a reduced portion of said valve element, said valve element being shiftable longitudinally from said neutral position to one of two work positions, said valve element being hollow at each end to a point adjacent the reduced portion and adapted in one work position to block communication through the bore between the inlet and outlet chambers while connecting one work port chamber with an adjacent exhaust passage through openings in the valve element communicating with one hollow end of said valve element and connecting the other work port chamber with the inlet through opening in the valve element communicating with the other hollow end of said valve element and in the other work position to block communication through the bore between the inlet and outlet chambers while connecting said other work port chamber with the adjacent exhaust passage through said openings in the valve element communicating with the said other hollow end of the valve element and connecting the inlet chamber and said one work port chamber through said openings in the valve element communicating with said one hollow end of said valve element. Preferably in a parallel valve, there is provided a branch chamber connected with the inlet means through said passage transverse to the bore and communicating with the bore in said other work position. In a preferred form of the invention the transverse passage extends through the valve parallel to the path of fluid from the inlet to the outlet means through the valve bore and element.

We have set out certain objects, advantages and purposes of our invention in the foregoing general disclosure.

Other objects, purposes and advantages of the invention will be evident from the following description and the accompanying drawings in which:

FIGURE 7 is a vertical longitudinal section through a second embodiment of a double acting priority circuit valve embodying our invention with the valve element in neutral;

FIGURE 8 is a section on the line VIII—VIII of FIGURE 7;

FIGURE 9 is a section on the line IX—IX of FIGURE 7;

FIGURE 10 is a vertical longitudinal section through a double acting series circuit valve embodying our invention with the valve element in neutral;

FIGURE 11 is a section on the line XI—XI of FIGURE 10;

FIGURE 12 is a section on the line XII—XII of FIGURE 10;

FIGURE 13 is a vertical longitudinal section of a second embodiment of series circuit valve embodying our invention with the valve element in neutral;

FIGURE 14 is a section on the line XIV—XIV of FIGURE 13;

FIGURE 15 is a section on the line XV—XV of FIGURE 13; and

FIGURE 16 is a vertical section through an assembly of valves according to the invention.

Figure 2:
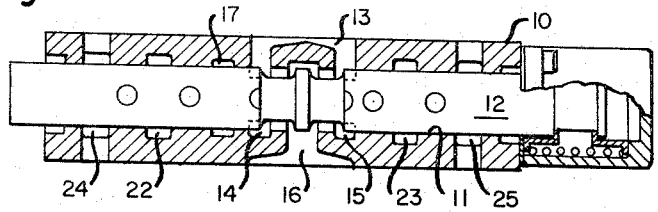
FIGURE 2 is a section on the line II—II of FIGURE 1.
Figure 3:
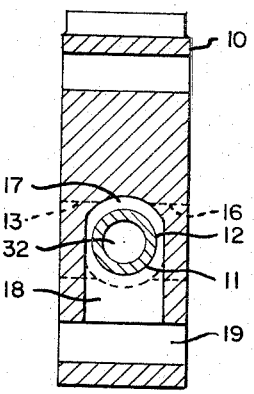
FIGURE 3 is a section on the line III—III of FIGURE 1.
Figure 1:
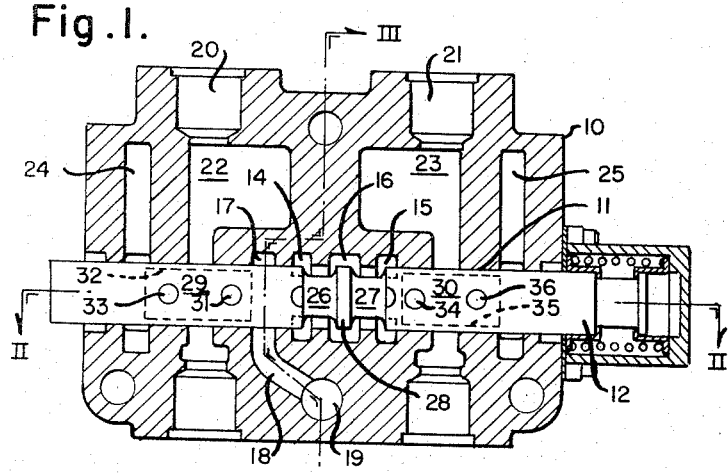
FIGURE 1 is a vertical longitudinal section through a double acting parallel valve embodying our invention with the valve element in neutral.

Referring to the drawings, we have illustrated in FIGURES 1–3 a parallel valve having a body 10 with a longitudinally extending bore 11 carrying a sliding valve element 12. A bifurcated inlet passage 13 having chambers 14 and 15 intersecting bore 11 receives high pressure fluid from a source, not shown, through inlet section 200 (see FIGURE 16). An outlet chamber 16 intersects bore 11 between inlet chambers 14 and 15. A branch chamber 17 intersects bore 11 adjacent one inlet chamber 14 and communicates through passages 18 with a through passage 19 lying in a plane parallel to and spaced below the plane of bore 11 and inlet chambers 14 and 15 and outlet chamber 16. The through passage 19 receives fluid from the source of high pressure fluid. Work ports 20 and 21 open out of body 10 and communicate with chambers 22 and 23 intersecting bore 11. Exhaust passages 24 and 25 intersect the bore 11 on opposite sides of work chambers 22 and 23.

In operation of the valve of FIGURES 1–3, high pressure fluid is introduced to the inlet 13 and through passage 19 through inlet section 200. With the valve in neutral position as shown the fluid passes through chambers 14 and 15 through grooves 26 and 27 in the valve element on opposite sides of central land 28 through bore 11 to outlet chamber 16 while at the same time passing through passage 19. The fluid from outlet 16 and passage 19 goes to a next succeeding section or to outlet section 201 (FIGURE 16) depending upon its position in a single or group assembly of valve sections. If the valve element 12 is moved to the right, viewing FIGURE 1, the passages through the bore from inlet chambers 14 and 15 to the outlet chamber 16 is blocked by land 28 and valve body portion 29. In this position of the valve element fluid from passage 19 goes through passage 18 to chamber 17, through openings 31 in the valve element body portion 29 into the hollow axial bore 32 and thence through openings 33 in the valve element body portion 29 to chamber 22 and port 20 to one side of a double acting cylinder or motor not shown. At the same time fluid is returned from the opposite side of said cylinder or motor to work port 21, thence to chamber 23, through openings 34 into hollow axial bore 35 in valve element body portion 30, out of openings 36 into exhaust passage 25. When the valve element is shifted a like amount in the opposite direction from neutral, high pressure fluid from chamber 15 enters opening 34 into hollow bore 35, out openings 36 into chamber 23 and port 21 to the motor or hydraulic cylinder. At the same time fluid from passage 19 passes through passage 18 into inlet chamber 14 where it supplements the input to passage 34. It will be apparent from the foregoing description that fluid from the parallel passage 19 is fed to the work port in both work positions, thereby providing true parallel action. The return fluid enters port 20, chamber 22, openings 31 through bore 32, out openings 33 into exhaust passage 24.

Figure 4:
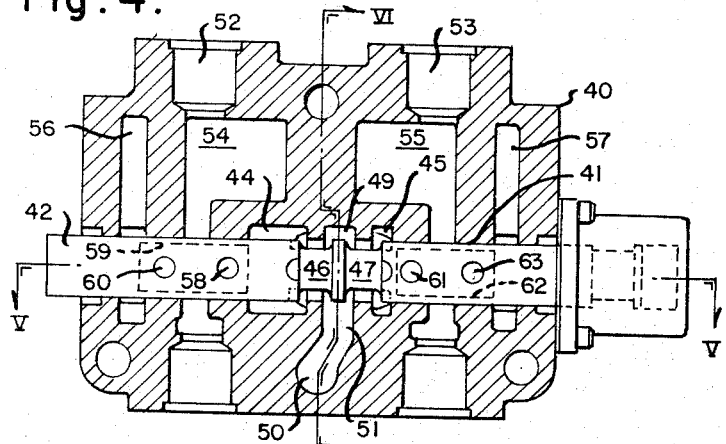
FIGURE 4 is a vertical longitudinal section through a double acting priority valve embodying our invention with the valve element in neutral.
Figure 6:
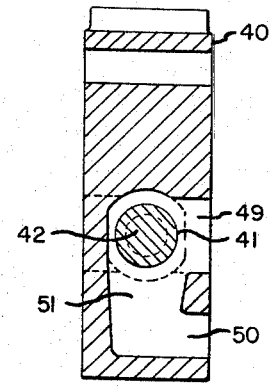
FIGURE 6 is a section on the line VI—VI of FIGURE 4.
Figure 5:
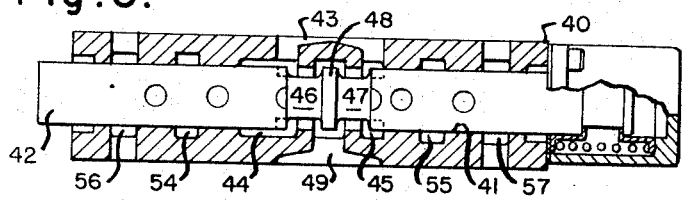
FIGURE 5 is a section on the line V—V of FIGURE 4.

In the case of a priority valve such as illustrated in FIGURES 4–6, we provide a body 40 having a bore 41 carrying a longitudinally movable valve element 42 therein. High pressure fluid enters a bifurcated inlet 43 and goes to spaced inlet chambers 44 and 45 intersecting bore 41. The fluid passes through bore 41 around grooves 46 and 47 on opposite sides of land 48 on the valve element 42. An outlet chamber 49 intersecting bore 41 between chambers 44 and 45 receives the fluid in the neutral position. A passage 50 lying in a plane spaced beneath and parallel to the plane of the inlet and outlet chambers communicates through passage 51 with outlet chamber 49. Outlet ports 52 and 53 open out of body 40 and communicate with work chambers 54 and 55 which intersect bore 41 on opposite sides of chambers 44 and 45. Exhaust ports 56 and 57 intersect bore 41 on opposite sides of work chambers 54 and 55. When the valve element is moved to the right, viewing FIGURE 4, the communication between inlet chambers 44 and 45 and outlet chamber 49 is cut off. Fluid from chamber 44 enters opening 58, passes through hollow bore 59 in one end of the valve element and out openings 60 into chamber 54, thence out work port 52 to the work cylinder or motor (not shown). Return fluid from the work cylinder or motor enters port 53, chamber 55, openings 61 in valve element 42, through hollow axial bore 62, out openings 63 into exhaust passages 57. Reverse movement of valve element 42 an equal amount on the opposite side of neutral causes high pressure fluid from chamber 45 to enter openings 61, bore 62, out openings 63 to chamber 55, work port 53 to the work cylinder. Return fluid enters port 52, chamber 54, openings 58 through hollow bore 59, openings 60 to exhaust chamber 56. In such a priority valve, the operation of the valve element to a work position prevents all flow of fluid through the section from inlet to outlet and diverts the entirety to the work ports. In the neutral position, fluid is passed through the valve for delivery to a next succeeding inlet by outlet 49 as well as a next succeeding parallel passage by passage 50.

In the priority double acting valve of FIGURES 7–9, we provide a valve structure identical with the structure of FIGURES 4–6 and bearing like numbers with the addition of the suffix *a* except for the passage 70 which extends through the valve body and has no communication with the bore 41*a*. In this valve, high pressure fluid passes simultaneously into inlet 43*a* and passage 70. The fluid in passage 70 passes directly through valve body 40*a* to a next succeeding passage in the following valve section.

We provide in a series valve as shown in FIGURES 10–12 a body 80 having an elongated bore 81 with a valve element 82 slidable therein. An inlet 83 intersects the bore 81 intermediate its ends. A bifurcated outlet 84 is provided with outlet chambers 85 and 86 intersecting bore 81 on opposite sides of inlet 83. Work chambers 87 and 88 intersect bore 81 on opposite sides of outlet chambers 85 and 86 and communicates with work ports 89 and 90. Exhaust passages 91 and 92 are provided adjacent work chambers 87 and 88. The outlet chambers 85 and 86 communicate through passages 93 and 94 with passage 95 below the bore. The passage 95 begins intermediate the sides of the valve and communicates with a port 96 on the downstream side for communication with the through passage of a next succeeding valve if available or to the outlet chamber 201.

The operation of this valve is as follows. Fluid entering inlet 83 passes through bore 81 and grooves 97 and 98 on opposite sides of center land 99 on valve element 82 into outlet chambers 85 and 86 when the valve is in the neutral position. When the valve element 82 is shifted to the left, viewing FIGURE 10, to one work position, fluid entering inlet 83 is blocked by land 99 and the valve element body from passing through bore 81 to the outlet chambers and passes through opening 100 into hollow bore 101 and out opening 102 all in valve element 82. The fluid leaving valve element openings 102 enters chamber 88 and passes through port 90 to one side of a work cylinder (not shown). Return fluid from the opposite side of the work cylinder enters port 89, chamber 87 and passes through bore 81 and groove 97 into outlet chamber 85 where it divides between outlet 84 and passage 96. When the valve element is shifted in the opposite direction to the other work position, high pressure fluid enters chamber 83, openings 103, bore 104 and openings 105 into chamber 87 and out port 89 to one side of the work cylinder. Return fluid from the opposite side of the work cylinder enters work port 90, chamber 88 and through bore 81 and groove 98 into outlet chamber 86 where it divides to outlet 84 and passage 96.

Another form of series valve according to our invention is illustrated in FIGURES 13–15. In this valve body 110 is provided with bore 111 carrying longitudinally movable valve element 112. The structure of this valve is identical with that of FIGURES 10–12 except that the passage 113 extends entirely through the valve and does not communicate with the outlet chambers. The valve is otherwise structurally and operatively the same and bears like numbers with the suffix *a*.

The valve sections are preferably assembled as shown in FIGURE 16 with an inlet section 200 and an outlet section 201 at opposite sides of the assembly. As will be seen from this figure, the various types of valves embodying our invention may be assembled together in any order without affecting the characteristic operation of any one of them. In FIGURE 16, we have assembled a priority valve 202 such as the valve of FIGURE 4, a series valve 203 of the type shown in FIGURE 13, a parallel valve 204 of the type of FIGURE 1, a series valve 205 of the type shown in FIGURE 9 and finally a priority valve 206 such as that of FIGURE 7.

In the foregoing specification, we have illustrated and described certain preferred embodiments of our invention; it will be understood, however, that this invention may be otherwise embodied within the scope of the following claims.

We claim:

1. A hydraulic parallel-type valve section comprising a body, inlet and outlet means in said body, a longitudinal bore extending through said body, an inlet chamber intersecting the bore and communicating with the inlet means, an outlet chamber intersecting the bore spaced from the inlet chamber and communicating with the outlet means, a passage in said body transverse to said bore in a plane parallel to and spaced from the plane of the inlet and outlet chambers and bore, said passage receiving fluid from one of the inlet means and outlet means, a pair of motor port chambers intersecting said bore, one on each side of the inlet and outlet chambers, a branch chamber between one work chamber and the inlet chamber and communicating with the said passage, exhaust passage means intersecting the bore adjacent each work port chamber, a valve element shiftable longitudinally of the bore from a neutral position in which fluid entering the inlet chamber passes to the outlet chamber through the bore around a reduced portion of said valve element, said valve element being shiftable longitudinally from said neutral position to one of two work positions, said valve element being hollow at each end to a point adjacent the reduced portion and adapted in one work position to block communication through the bore between the inlet and outlet chambers while connecting one work port chamber with an adjacent exhaust chamber through spaced openings in the valve element communicating with one hollow end portion and connecting the other work port chamber with the inlet chamber through openings in the valve element communicating with the other hollow end portion while interconnecting the inlet chamber and branch chamber through the bore around a reduced portion of said valve element and in the other work position to block communication between the inlet and outlet chambers through the bore while connecting said other work chamber with the adjacent exhaust passage through said openings in the valve element communicating with the said other hollow end of the valve element and connecting the branch chamber and said one work port through said openings in the valve element communicating with said one hollow end of said valve element.

2. A hydraulic priority valve section comprising a body, inlet and outlet means in said body, a longitudinal bore extending through said body, an inlet chamber intersecting the bore and communicating with the inlet means, an outlet chamber intersecting the bore spaced from the inlet chamber and communicating with the outlet means, a passage in said body beginning intermediate the sides of said body and extending to the outlet side transverse to said bore in a plane parallel to and spaced from the plane of the inlet and outlet chambers and bore, said passage receiving fluid from outlet means, a pair of motor port chambers intersecting said bore, one on each side of the inlet and outlet chambers, exhaust passage means intersecting the bore adjacent each work port chamber, a valve element shiftable longitudinally of the bore from a neutral position in which fluid entering the inlet chamber passes to the outlet chamber through the bore around a reduced portion of said valve element, said valve element being shiftable longitudinally from said neutral position to one of two work positions, said valve element being hollow at each end to a point adjacent the reduced portion and adapted in one work position to block communication through the bore between the inlet and outlet chambers while connecting one work port chamber with an adjacent exhaust chamber through spaced openings in the valve element communicating with one hollow end portion and connecting the other work port chamber with the inlet chamber through openings in the valve element communicating with the other hollow end portion and in the other work position to block communication between the inlet and outlet chambers through the bore while connecting said other work chamber with the adjacent exhaust passage through said openings in the valve element communicating with the said other hollow end of the valve element and connecting the inlet chamber and said one work port through said openings in the valve element communicating with said one hollow end of said valve element.

3. A hydraulic priority-type valve section comprising a body, inlet and outlet means in said body, a longitudinal bore extending through said body, an inlet chamber intersecting the bore and communicating with the inlet means, an outlet chamber intersecting the bore spaced from the inlet chamber and communicating with the outlet means, a passage in said body transverse to said bore in a plane parallel to and spaced from the plane of the inlet and outlet chambers and bore, said passage receiving fluid from the inlet means, a pair of motor port chambers intersecting said bore, one on each side of the inlet and outlet chambers, exhaust passage means intersecting the bore adjacent each work port chamber, a valve element shiftable longitudinally of the bore from a neutral position in which fluid entering the inlet chamber passes to the outlet chamber through the bore around a reduced portion of said valve element, said valve element being shiftable longitudinally from said neutral position to one of two work positions, said valve element being hollow at each end to a point adjacent the reduced portion and adapted in one work position to block communication through the bore between the inlet and outlet chambers while connecting one work port chamber with an adjacent exhaust chamber through spaced openings in the valve element communicating with one hollow end portion and connecting the other work port chamber with the inlet chamber through openings in the valve element communicating with the other hollow end portion and in the other work position to block communication between the inlet and outlet chambers through the bore while connecting said other work chamber with the adjacent exhaust passage through said openings in the valve element communicating with the said other hollow end of the valve element and connecting the inlet chamber and said one work port through said openings in the valve element communicating with said one hollow end of said valve element.

4. A hydraulic series type valve section comprising a body, inlet and outlet means in said body, a longitudinal bore extending through said body, an inlet chamber intersecting the bore and communicating with the inlet means, an outlet chamber intersecting the bore spaced from the inlet chamber and communicating with the outlet means, a passage in said body transverse to said bore in a plane parallel to and spaced from the plane of the inlet and outlet chambers and bore, said passage receiving fluid from the inlet means, a pair of motor port chambers intersecting said bore, one on each side of the inlet and outlet chambers, exhaust passage means intersecting the bore adjacent each work port chamber, a valve element shiftable longitudinally of the bore from a neutral position in which fluid entering the inlet chamber passes to the outlet chamber through the bore around a reduced portion of said valve element, said valve element being shiftable longitudinally from said neutral position to one of two work positions, said valve element being hollow at each end to a point adjacent the reduced portion and adapted in one work position to block communication through the bore between the inlet and outlet chambers while connecting one work port chamber with an adjacent outlet chamber through spaced openings in the valve element communicating with one hollow end portion and connecting the other work port chamber with the inlet chamber through openings in the valve element communicating with the other hollow end portion and in the other work position to block communication between the inlet and outlet chambers through the bore while connecting said other work chamber with the adjacent outlet chamber through said openings in the valve element communicating with the said other hollow end of the valve element and connecting the inlet chamber and said one work port through said openings in the valve element communicating with said one hollow end of said valve element.

5. A hydraulic valve section comprising a body, inlet and outlet means in said body, a longitudinal bore extending through said body, an inlet chamber intersecting the bore and communicating with the inlet means, an outlet chamber intersecting the bore spaced from the inlet chamber and communicating with the outlet means, a passage in said body beginning intermediate the sides of said body and extending to the outlet side transverse to said bore in a plane parallel to and spaced from the plane of the inlet and outlet chambers and bore, said passage receiving fluid from the outlet means, a pair of motor port chambers intersecting said bore, one on each side of the inlet and outlet bore, exhaust passage means intersecting the bore adjacent each work port chamber, a valve element shiftable longitudinally of the bore from a neutral position in which fluid entering the inlet chamber passes to the outlet chamber through the bore around a reduced portion of said valve element, said valve element being shiftable longitudinally from said neutral position to one of two work positions, said valve element being hollow at each end to a point adjacent the reduced portion and adapted in one work position to block communication through the bore between the inlet and outlet chambers while connecting one work port chamber with an adjacent outlet chamber through spaced openings in the valve element communicating with one hollow end portion and connecting the other work port chamber with the inlet chamber through openings in the valve element communicating with the other hollow end portion and in the other work position to block communication between the inlet and outlet chambers through the bore while connecting said other work chamber with the adjacent outlet chamber through said openings in the valve element communicating with the said other hollow end of the valve element and connecting the inlet chamber and said one work port through said openings in the valve element communicating with said one hollow end of said valve element.

6. A hydraulic valve section comprising a body, inlet and outlet means in said body, a longitudinal bore extending through said body, an inlet chamber intersecting the bore and communicating with the inlet means, an outlet chamber intersecting the bore spaced from the inlet chamber and communicating with the outlet means, a passage in said body transverse to said bore in a plane parallel to and spaced from the plane of the inlet and outlet chambers and bore, said passage receiving fluid from one of the inlet means and outlet means, a pair of motor port chambers intersecting said bore, one on each side of the inlet and outlet chambers, exhaust passage means intersecting the bore adjacent each work port chamber, a valve element shiftable longitudinally of the bore from a neutral position in which fluid entering the inlet chamber passes to the outlet chamber through the bore around a reduced portion of said valve element, said valve element being shiftable longitudinally from said neutral position to one of two work positions, said valve element being hollow at each end to a point adjacent the reduced portion and adapted in one work position to block communication through the bore between the inlet and outlet chambers while connecting one work port chamber with one of an adjacent exhaust chamber and an outlet chamber through spaced openings in the valve element communicating with one hollow end portion and connecting the other work port chamber with the inlet chamber through openings in the valve element communicating with the other hollow end portion and in the other work position to block communication between the inlet and outlet chambers through the bore while connecting said other work chamber with the adjacent exhaust chamber and an outlet chamber through said openings in the valve element communicating with the said other hollow end of the valve element and connecting the inlet chamber and said one work port through said openings in the valve element communicating with said one hollow end of said valve element.

No references cited.

ALAN COHAN, *Primary Examiner.*

H. KLINKSEIK, *Assistant Examiner.*